May 17, 1949.  J. E. JOHANSSON  2,470,702
INTERNAL-COMBUSTION ENGINE PLANT, INCLUDING
A SCAVENGING COMPRESSOR DRIVEN BY
AN EXHAUST GAS TURBINE
Filed April 17, 1944  3 Sheets-Sheet 3
FIG_6
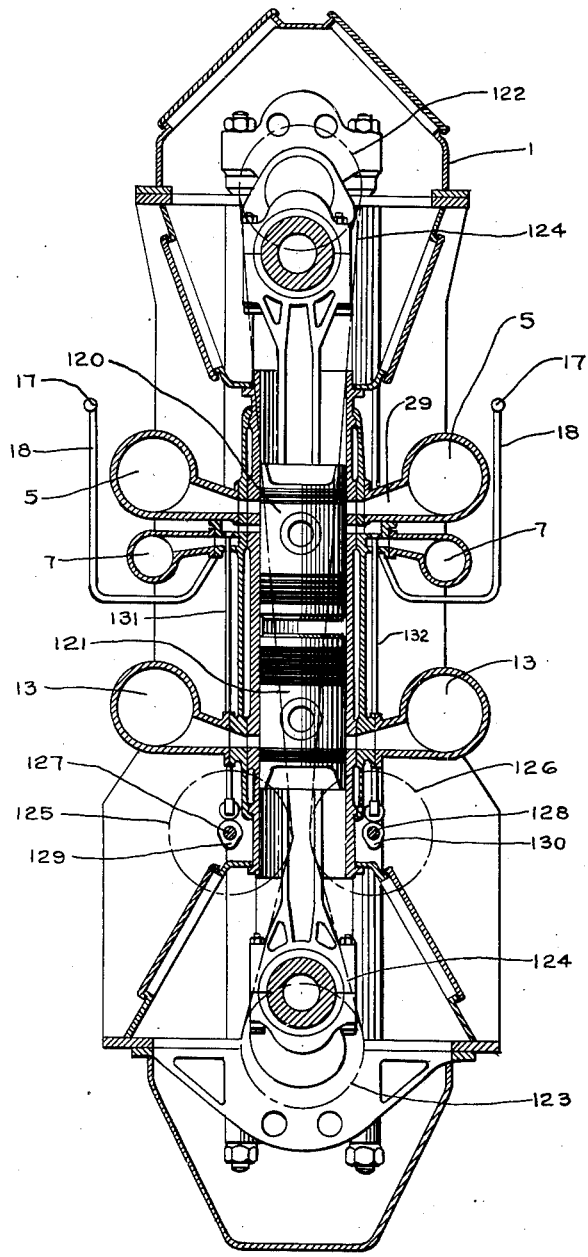
FIG_7
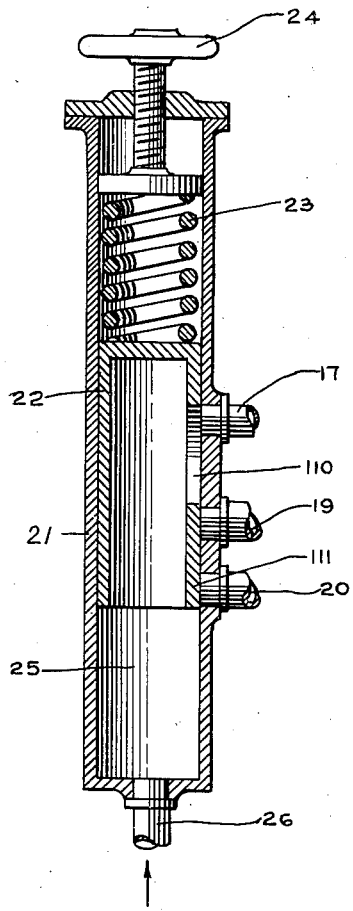
Inventor
JOHAN ERIK JOHANSSON
By Cushman Darby & Cushman
Attorneys Patented May 17, 1949

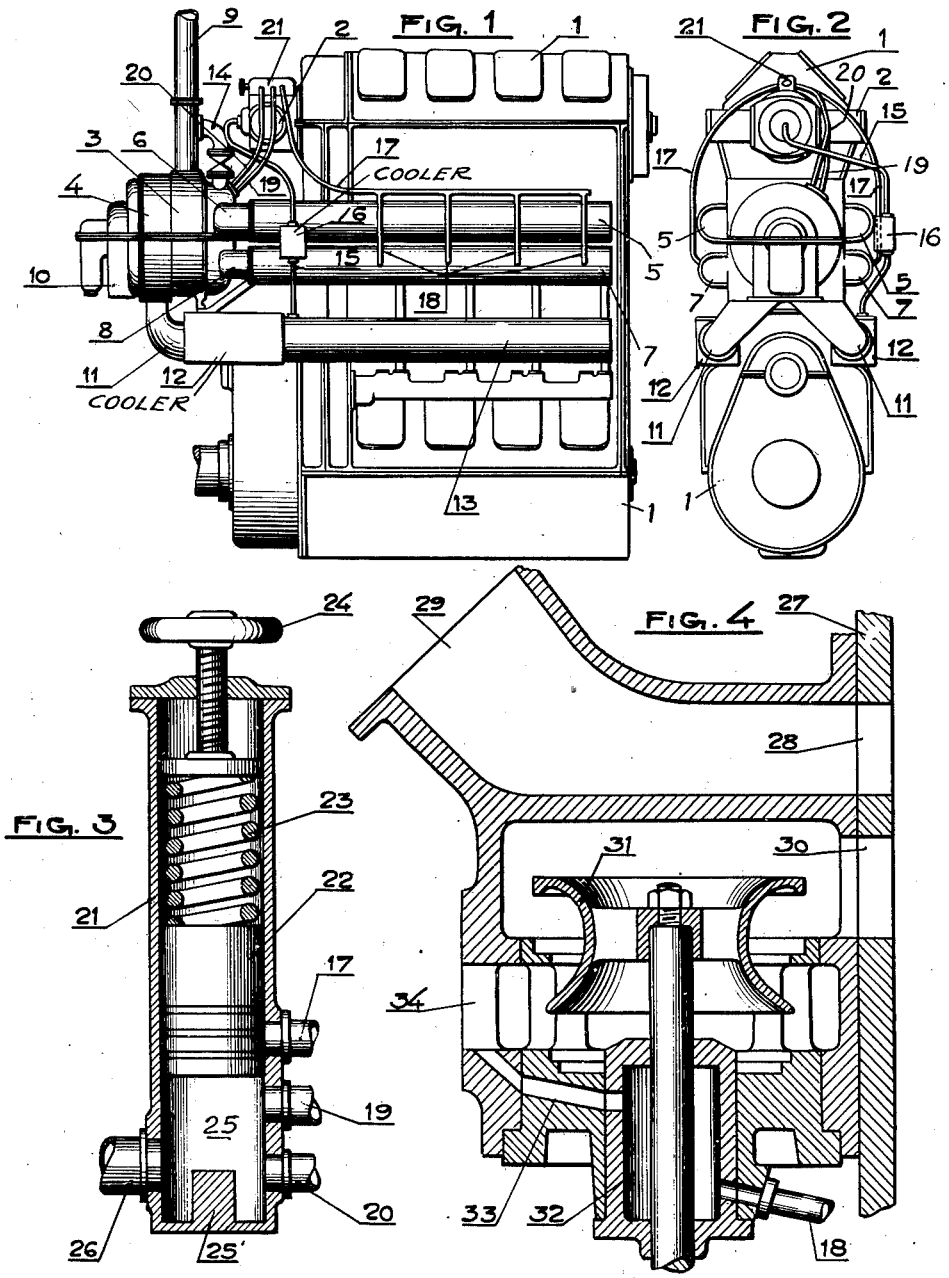

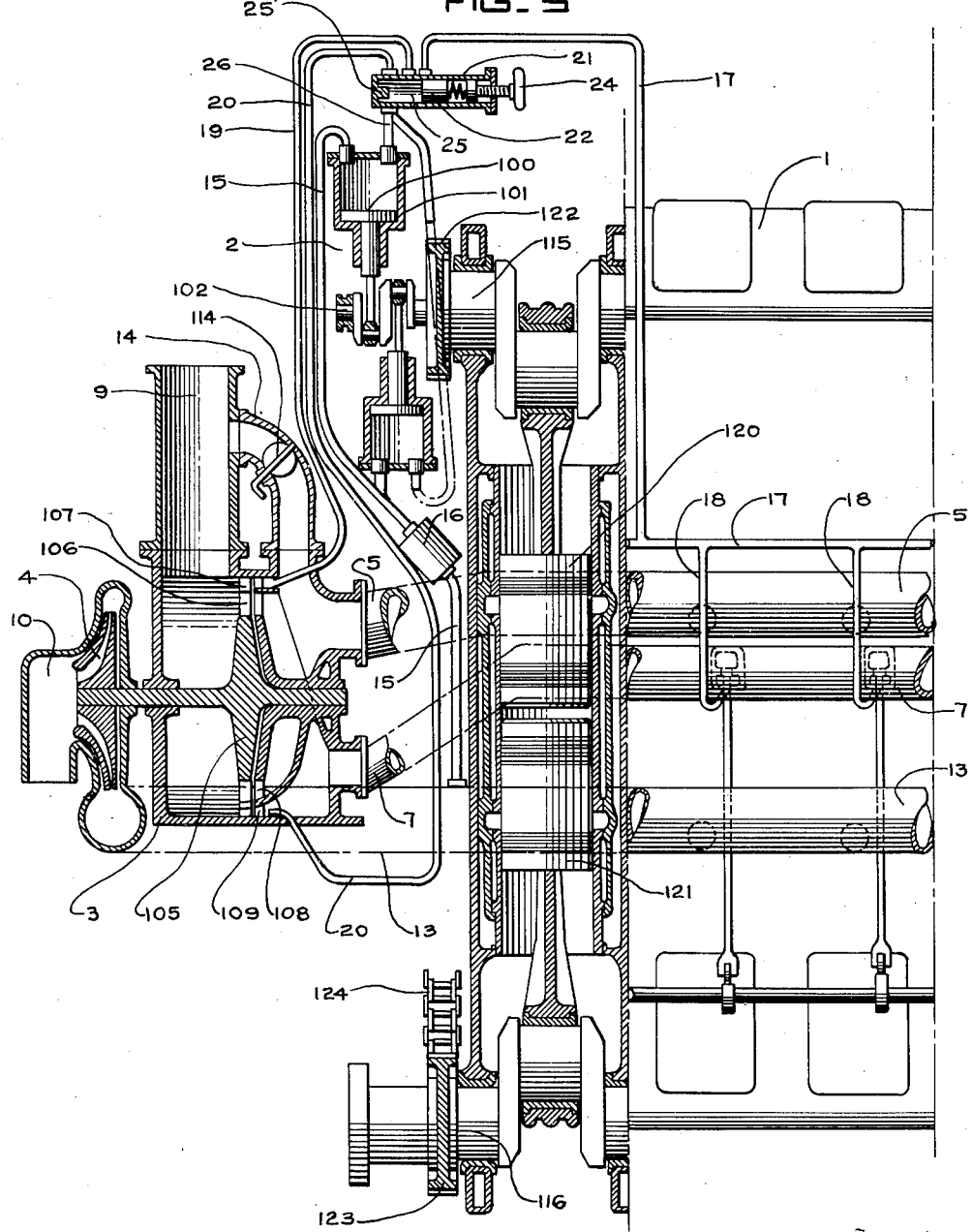

2,470,702

UNITED STATES PATENT OFFICE 2,470,702

INTERNAL-COMBUSTION ENGINE PLANT, INCLUDING A SCAVENGING COMPRESSOR DRIVEN BY AN EXHAUST GAS TURBINE

Johan Erik Johansson, Goteborg, Sweden, assignor to Aktiebolaget Götaverken, Goteborg, Sweden, a corporation of the Kingdom of Sweden Application April 17, 1944, Serial No. 531,523
In Sweden May 7, 1943

3 Claims. (Cl. 60—13)

This invention relates to improvements in internal combustion engine plants in which a turbine driven by exhaust gases from an internal combustion engine is arranged to drive a compressor for producing scavenging air and, if desired, supercharging air for the engine. The principal object of the invention is to provide means for reducing the temperature of exhaust gases withdrawn from the engine at a pressure higher than the final expansion pressure in the engine, whereby to render possible the utilization of such high pressure exhaust gases in the turbine.

This and further objects are attained by an arrangement illustrated in the accompanying drawing, in which Fig. 1 is a side elevation of an engine with pistons working in opposite directions and combined with an exhaust gas turbine in accordance with the invention; Fig. 2 is an end elevation of the engine shown in Fig. 1 and viewed from the turbine side thereof; Fig. 3 illustrates a distributing valve for controlling the supply of air under pressure to the turbine driven by the engine; Fig. 4 is a sectional view of the exhaust portion of a cylinder in an engine according to the invention; Fig. 5 is an enlarged detailed side view with parts in section showing somewhat diagrammatically and with the surrounding casing removed, one end of the engine plant; Fig. 6 is a vertical sectional view of the pistons and their associated parts and taken substantially at right angles to Fig. 5; and Fig. 7 is a vertical sectional view of a modification of the distributing valve shown in Fig. 3.

In Figs. 1 and 5, numeral 1 denotes a multi-cylinder engine having pistons working in opposite directions, and numeral 2 denotes a two-cylinder reciprocating compressor which is directly connected to the upper engine shaft. 3 denotes an exhaust gas turbine, and 4 a scavenging and supercharging compressor of the rotational type driven by the turbine 3. The engine is provided with two exhaust gas pipes 5 for exhaust gases finally expanded in the engine cylinders. The exhaust gas pipes 5 are, at 6, connected to the exhaust gas turbine. The engine is further provided with two exhaust gas pipes 7 for exhaust gases of a pressure higher than the final pressure in the engine, said exhaust gas pipes 7 being connected at 8, to another portion of the exhaust gas turbine. After having given off the greatest part of their power in the turbine, the exhaust gases are discharged into the atmosphere through a discharge pipe 9.

The air intake of the compressor 4 driven by the exhaust gas turbine is indicated at 10. The scavenging and supercharging air produced by said compressor is admitted, through conduits 11 and coolers 12, to the scavenging conduits 13 which in usual manner can be brought to communicate with the cylinders of the engine.

By means of an outlet 14, the exhaust gas turbine can be by-passed upon opening of a valve 114 located in said outlet 14.

From a place in the scavenging air conduits after the coolers 12, air can be supplied through a conduit 15 to the inlet of the compressor 2. A cooler 16 may be provided in the conduit 15. A pressure conduit 17 from the compressor 2 is connected to a plurality of branch conduits 18 through which air under pressure is supplied to the high pressure exhaust gases from the engine immediately as they leave the engine. Said air under pressure, the temperature of which is lower than the temperature of the high pressure exhaust gases, is mixed with said gases in the pipes 7. Consequently, when the exhaust gases are entering the turbine, the temperature of the mixture has been lowered to a value not detrimental to the turbine. From the compressor 2 additional conduits 19 and 20 for air at different pressures lead directly to the turbine 3. These conduits as well as the exhaust gas pipes 5 and 7 may be connected to various nozzles or groups of guide vanes in the exhaust gas turbine.

In the embodiment shown, control of the supply of gas and air to the turbine and the exhaust gas pipes 7 is effected automatically by means of a control piston 22 disposed in a casing 21 and adapted to be acted upon one side by a spring 23, the tension of which can be varied by means of a handwheel 24 and, on the other side, by means of the counter pressure ahead of the turbine. To this end, the space 25 limited by the piston 22 is connected, through a conduit 26, with the outlets from the reciprocating compressors, and, through the conduit 20, to a nozzle or group of guide vanes in the turbine, and through a conduit 19, to another nozzle or guide vane group. Through the conduit 17, the space 25 can be connected with the high pressure exhaust gas pipe 7. The bottom of the casing 21 may be provided with an inwardly extending projection or stop 25' (Fig. 3) to prevent the piston 22 from being forced down over the inlet of the conduit 26, or the conduit 26 may be connected to the bottom of the casing as shown in Figure 7.

It will be obvious that at low load on the engine plant, when the counter pressure in the exhaust gas turbine is also low, the piston 22 will be forced inwardly into the space 25. As a result thereof, the conduit 20 only will be open for the purpose of direct supply of air under pressure to the exhaust gas turbine. If the speed of the engine and the pressure of the air supplied by the reciprocating compressor increase, the piston 22 gradually compresses the spring 23 with the result that also the conduit 19 will be uncovered and, finally, at a certain adjustable load, also the conduit 17, so that air under pressure will be admitted to the high pressure exhaust gas pipes 7. Fig. 7 shows a modified form of distributing valve for controlling the supply of air under pressure to the turbine and includes the hollow piston 22 which has a lateral slot 110 through which the space 25 communicates with the conduits 17, while the wall portion 111 covers the mouths of the conduits 19 and 20.

Fig. 4 illustrates in detail the means for supplying air under pressure to the high pressure exhaust gas pipes 7 in combination with the members controlling the outlet of the exhaust gases. Numeral 27 indicates a wall of an engine cylinder and 28 the usual exhaust ports through which exhaust gases of the final pressure in the engine are discharged to the exhaust gas pipes 5 by means of passages 29. Through separate ports 30, exhaust gases are discharged from the engine cylinder, said exhaust gases having a pressure higher than the final pressure in the cylinder. The discharge of the last named exhaust gases is controlled by a valve 31 which is preferably actuated in a manner such as to be closed simultaneously with or shortly after the uncovering of the ports 28. The air pressure conduit 18 is connected to a chamber 32 surrounding the stem of the valve 31. From said chamber, the air passes through passages 33 to the outlet openings 34 provided in the casing of the valve. At this place, the air under pressure is mixed with the hot exhaust gases and reduces the temperature of the same. In the chamber 32, the stem of the valve 31 is cooled to some extent by the air under pressure.

The engine shown in the drawing is provided with pistons 120 and 121 running in opposite directions and connected with the two crank-shafts 115 and 116 respectively. On the crank-shafts 115 and 116 are disposed chain wheels 122 and 123 respectively on which a chain 124 runs. The chain actuates chain wheels 125 and 126 which are attached to the cam shafts 127 and 128, respectively. Cams 129 and 130 respectively arranged on the shafts 127 and 128 actuate valve stems 131 and 132 which support and actuate valve bodies 31 in valves whose construction appears from Fig. 4.

In Fig. 5 the compressor is shown diagrammatically and without surrounding casing. The compressor pistons 100 which run in cylinders 101 are driven by a crank-shaft 102 directly connected with the upper crank-shaft 115 of the engine.

The rotor 105 of the turbine 3 has a low pressure blade rim 106 and a high pressure blade rim 107 and corresponding guide vane rims 108 and 109, respectively. The conduits 19 and 20 leading from the compressor 2 communicate with the guide vane rim 109 for the gases coming from the high pressure gas conduit 7. A flap 114 is arranged in the by-pass conduit 14.

Due to the arrangement described, it is possible to operate the internal combustion engine at high supercharging and, consequently, at a high output. The turbo compressor can be started more quickly than otherwise by means of air from the compressor directly driven by the engine. Said compressor consumes but a relatively low quantity of the engine output, for instance, about 1.5 to 2% of the engine output. In accordance with varying conditions, the power required for the auxiliary compressor will, however, vary between 0.5 and 5% of the engine output.

Due to the fact that air under pressure at relatively low temperature is supplied to the high pressure exhaust gas conduit connected to the turbine, exhaust gases at a relatively high pressure and, consequently, high temperature can be withdrawn from the engine and, after having been mixed with air, utilized in the turbine without damaging same. For example, in a power plant of the type in consideration, in which the temperature of the high pressure exhaust gases amounts to about 620 degrees centigrade and in which one part by weight of air under pressure is mixed with about five parts by weight of gases, the temperature of the mixture will amount to about 540 degrees centigrade, the air supplied being obtained at a temperature of about 100 degrees centigrade, from a compressor directly driven by the engine. The additional compressor further has for its purpose to supply fluid under pressure directly to the exhaust gas turbine under conditions, such as in idling or at the start, where exhaust gases from the engine are not able to drive the turbine with such a power as to enable the scavenging air compressor driven by the turbine to produce an air quantity sufficient to the effective operation of the engine.

If the additional source of air under pressure consists of a compressor directly driven by the engine, such compressor will always supply an air quantity corresponding to the speed of the engine, said air quantity being, in this case, positively regulated according as the requirement may be. Further, a compressor directly driven by the engine has relatively small dimensions and can be constructed so as to be very reliable and economical in operation.

The internal combustion engine plant described above with reference to the drawing is not limited to the embodiment shown, but may be modified in various manners within the scope of the appended claims.

What I claim is:

1. An internal combustion engine plant comprising in combination, an internal combustion engine, a turbine adapted to be driven by exhaust gases from said engine, a scavenging air compressor mechanically connected with said turbine, a first exhaust gas conduit for supplying exhaust gases finally expanded in said engine to said turbine, a second exhaust gas conduit for supplying to said turbine high pressure exhaust gases at a pressure higher than the final pressure in said engine, a scavenging air conduit for supplying scavenging air from said scavenging compressor to said engine, a second compressor mechanically connected with said engine and constructed and arranged to produce air at a pressure higher than the pressure of said scavenging air and at a temperature lower than the temperature of said high pressure exhaust gases, means for supplying air from said second compressor to said turbine, and means responsive to an increase of the pressure of air produced by said second compressor for supplying air from said second compressor to said second exhaust gas conduit.

2. An internal combustion engine plant comprising in combination, an internal combustion engine, a turbine adapted to be driven by exhaust gases from said engine, a scavenginging air compressor mechanically connected with said turbine, a first exhaust gas conduit for supplying exhaust gases finally expanded in said engine to said turbine, a second exhaust gas conduit for supplying to said turbine high pressure exhaust gases at a pressure higher than the final pressure in said engine, a scavenging air conduit for supplying scavenging air from said scavenging compressor to said engine, a second compressor mechanically connected with said engine and constructed and arranged to produce air at a pressure higher than the pressure of said scavenging air and at a temperature lower than the temperature of said high pressure exhaust gases, a control valve member, a first pipe for connecting said valve member to the outlet of said second compressor, a second pipe for connecting said valve member to said turbine, and a third pipe for connecting said valve member to said second exhaust gas conduit, said valve member having a reciprocating piston for selectively controlling the flow of air through said pipes.

3. An internal combustion engine plant comprising in combination, an internal combustion engine, a turbine adapted to be driven by exhaust gases from said engine, a scavenging air compressor mechanically connected with said turbine, a first exhaust gas conduit for supplying exhaust gases finally expanded in said engine to said turbine, a second exhaust gas conduit for supplying to said turbine high pressure exhaust gases at a pressure higher than the final pressure in said engine, a scavenging air conduit for supplying scavenging air from said scavenging compressor to said engine, a source of compressed air adapted to supply air at a pressure higher than the pressure of said scavenging air and at a temperature lower than the temperature of said high pressure exhaust gases, means for supplying air from said source to said turbine, and means responsive to an increase of the pressure of the air delivered by said source for supplying air from said source to said second exhaust gas conduit.

JOHAN ERIK JOHANSSON.

REFERENCES CITED

The following references are of record in the file of this patent:

UNITED STATES PATENTS

| Number | Name | Date |
|---|---|---|
| 1,765,716 | Curtis | June 24, 1930 |
| 1,783,018 | Johansson | Nov. 25, 1930 |
| 1,849,170 | Büchi | Mar. 15, 1932 |
| 1,950,467 | Willgoos | Mar. 13, 1934 |
| 2,065,106 | Symons | Dec. 22, 1936 |

FOREIGN PATENTS

| Number | Country | Date |
|---|---|---|
| 204,691 | Great Britain | Apr. 9, 1925 |
| 309,591 | Great Britain | Jan. 30, 1930 |